United States Patent Office 3,130,151
Patented Apr. 21, 1964

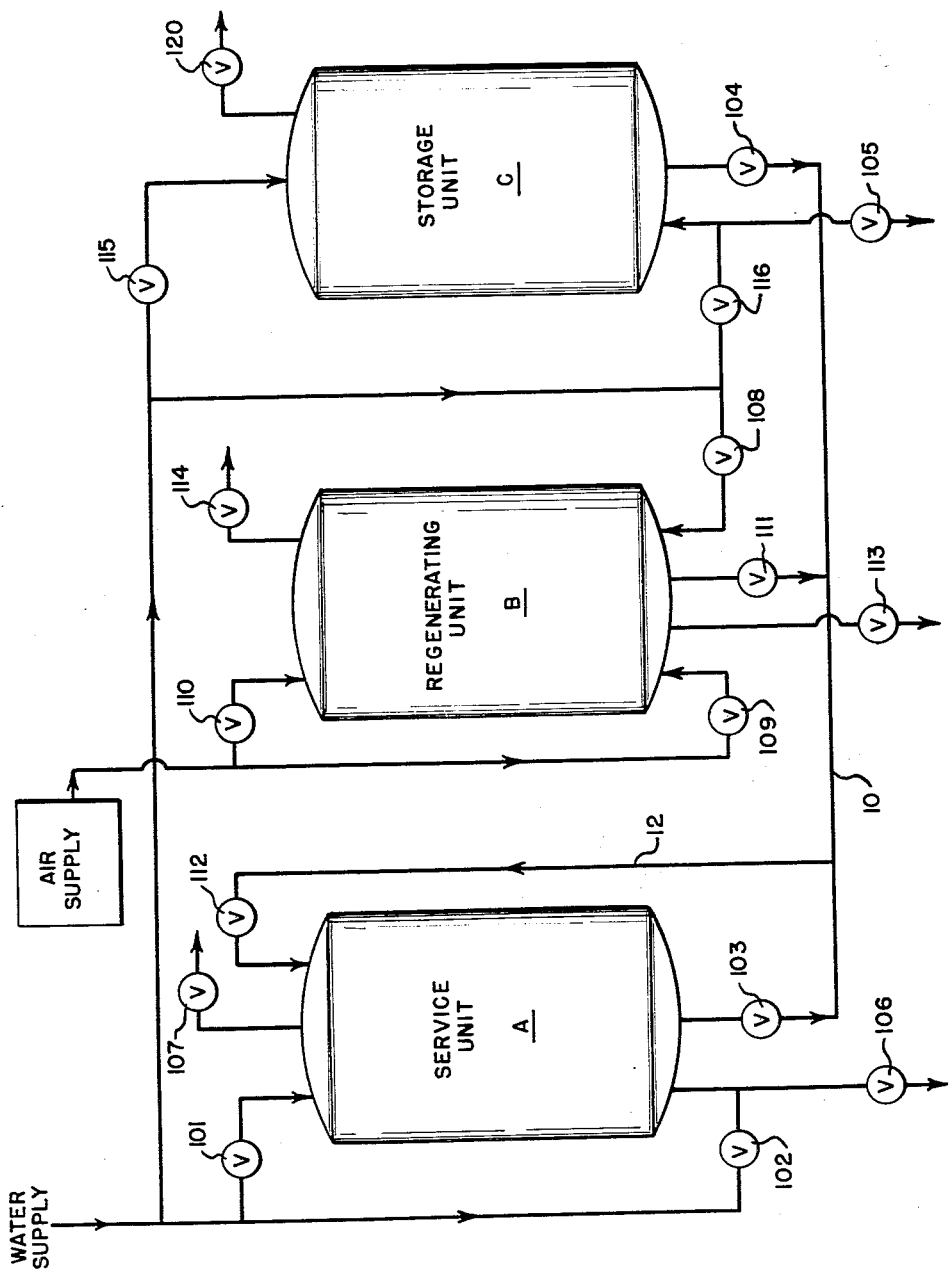

3,130,151
RESIN TRANSFER SYSTEM
Joseph A. Levendusky, Bayonne, N.J., assignor to Union
Tank Car Company, Chicago, Ill.
Filed June 2, 1961, Ser. No. 114,347
5 Claims. (Cl. 210—33)

This invention relates to a method of transferring mixed solids of different densities to a treating zone wherein the mixed solids are substantially uniformly distributed in the treating zone and more particularly to a method of transferring mixed ion exchange resins of different densities to a liquid treating zone or service unit.

The invention generally relates to the transfer of various mixed solids of different densities where it is desired or necessary to deposit the solids in substantially uniform distribution. The invention is particularly applicable to the art of water demineralization and the regeneration of resins used therein. The invention will thus be particularly described with relation to the demineralization of water.

The art of water demineralization encompasses the removal of ionized dissolved materials and salts from raw water supplies. These materials, which in their ionized form are undesirable, are removed by passing raw or untreated water through beds of ion exchange resins. Ion exchange resins are special synthetic resins in granular form which have the property of giving up an ion and taking on a free ion from the liquid.

For example, in a typical process, raw or natural water containing dissolved ionized salts is passed through a bed of cation exchange resin. As a result of the ion exchange between the resin and the water, the salt is changed to the corresponding acid. The water is then passed through a bed of anion exchange resin where the ion exchange reaction removes the acid. High purity water necessary for the manufacture of fine chemicals, pharmaceuticals, plastics, foodstuffs, fine paper, photographic film and the like, is thereby obtained.

The same results can also be achieved by passing water through a bed of mixed cation and anion resins. The invention has particular application to mixed bed operations.

After a period of use the ion exchange properties of the resins decrease and the beds become exhausted. To regenerate the resins and make them available for future use, the resin must be regenerated with an acid or alkali solution, depending upon the type of resin.

Regeneration of the resins may take place in the service tank, or in a tank or tanks external to the service units. Regeneration of the ion exchange resin in the service tank has several serious disadvantages: (1) the service run must be interrupted for the time required to regenerate; (2) possibility of contamination from regenerants (this is especially critical in high pressure steam turbine systems); (3) higher cost resulting from longer down-time in the service run; (4) more complicated design of service unit with resulting higher installed cost. External regeneration substantially overcomes these limitations of in-place regeneration.

A basic problem in external regeneration relates to the transfer of the resin or resins from the service unit to a unit in which regeneration can take place and then back again to the service unit. These transfers must take place quickly to shorten down-time and to allow more time for thorough regeneration in the external unit. The transfer must involve a minimum loss of resin if the system is to operate economically. With reference to mixed resin bed operations, it is also necessary that after the transfer of the resins back into the service unit that the resins be in a uniformly mixed state.

Heretofore resin transfer has been effected primarily by hydraulic, pneumatic or mechanical means. Generally, a hydraulic means is most predominantly used in the water softening and demineralizing field and in the related fields of sugar and oil refining. Hydraulic transfer means usually require excessive amounts of water. Where one kind of resin is transferred or the uniformity of mixed resins is not critical, hydraulic means are generally adequate.

However, where it is desired to transfer anion and cation resins in a mixed state, a purely hydraulic means is ineffective. Cation and anion resins have different densities. Therefore, in a fluid environment, the heavier cation resin tends to settle first. When a hydraulic transfer means is used, the resins tend to separate and settle in the pipeline during the transfer. This may be overcome by maintaining a higher velocity stream to provide the necessary turbulence for mixing. But the settling problem is not thereby solved because a higher velocity stream means that more water is introduced into the service vessel as a result. This excessive amount of water in the service tank cannot be removed quickly enough to avoid separation and settling in the service tank. The settling destroys the desired uniformity of the mixed bed. In addition, since the cation settles first, an upper layer of predominantly anion resins begins to form. In this high pH environment some unwanted metallic precipitation takes place thus hampering the efficiency of the unit. If a dense, acid regenerated cation exchange resin layer is allowed to form at the bottom of the unit, a low pH effluent may result.

Pneumatic transfer of granular solids has several limitations. Transfer by this means alone tends not to be uniform, the system being subject to air occlusion. At times air has been blown through the resin mass without moving the resin. Pneumatic means alone does not clean the tank from which resin is transferred as thoroughly as for example hydraulic means.

Mechanical transfer devices have the disadvantage of requiring cumbersome and expensive machinery. The use of such devices, alone or in combination with pumps, may result in excessive resin attrition or particle breakdown.

The invention overcomes the disadvantages of hydraulic, pneumatic and mechanical transfer means by combining hydraulic and pneumatic principles to transfer the resin.

Broadly, I propose in a water demineralizing installation an external resin regenerating system whereby mixed cation and anion exchange resins are transferred from a mixed bed service unit to a storage unit by hydraulic means, transferred by hydraulic means to a regenerating unit, regenerated, then transferred by hydro-pneumatic means back to the service unit. In this last mentioned step of the process, the resin is transferred from the regenerating unit to the service unit by having a flow of air and water acting as the fluidizing media and air at the top of the tank of the regenerating unit acting as the pressurizing media. By introducing air into the mass of water and resin sufficient turbulence is maintained during the transfer and the air bubbles act to reduce friction between the mass being transferred and the pipeline walls. Therefore, this system permits the use of lower transfer velocities which results in minimum attrition loss. It also permits the use of smaller amounts of water thus substantially avoiding the settling problem in the service tank. Because the uniformly mixed state of the bed can be maintained at the end of the transfer, the usual step of final air mixing of the resins is avoided.

Operation of the resin transfer system will be more readily understood by reference to the drawing which shows a preferred embodiment of my invention.

FIG. 1 is a flow diagram of a transfer and regenerating system having a service unit, a regneration unit and a storage unit. In this particular embodiment of the invention air is used as the pressurizing medium. However, other suitable gases may be used, such as nitrogen.

After the resins in the service unit A have become exhausted they are removed and transferred hydraulically from the service unit A to the storage unit C via transfer line 10. To do this, water supply valves 101 and 102, transfer line valves 103 and 104, and vent valve 120 are opened. The water entering through valves 101 and 102 forces the resin out of the service unit A, through valve 103, through the transfer line 10, through valve 104 and into storage tank C, the displaced air escaping from tank C through vent valve 104. Excess water in tank C is removed through drain valve 105.

After transfer into the storage unit C is completed, all water is then removed from service unit A by opening drain valve 106 and vent valve 107.

The next step is to transfer the regenerated resin from the regenerating unit B into the service unit A. It is assumed that prior to this step all the resin has been regenerated, mixed and given a final rinse in the regenerating tank. First water valve 108 is opened then air valve 109. This combination of air and water is for the purpose of fluidizing the resin mass prior to transfer. Water valve 108 is then closed but air valve 109 is kept open until a sufficient pressure has been established in the tank to move the entire mass of resin, water and air. Transfer line valves 111 and 112 are then opened and vent valve 107 and drain valve 106 are opened. At the same time air valve 110 is opened in addition to air valve 109. The forces of the water entering into the regenerating unit B and the air pressure established above the resin bed forces the mass of resin, air, and water through valve 111, through transfer lines 10 and 12, through valve 112 and into the top of service unit A. The combined action of air and water keep the resin in a mixed state during transfer and reduce the friction of the particles against the walls of the transfer lines. It can also be seen that a substatnially smaller quantity of water is necessary in this step because of the motive force supplied by the air under pressure. Although the water pressure contributes to the force of transfer, its primary function in this step is to provide a suitable medium to aid in the actual movement of the resins through the transfer lines. Since a smaller amount of water is used there is less chance for the resins to settle and become separated during transfer and particularly after transfer in the service unit. As the mass of resin, air and water enters the service unit, the water quickly drains off through valve 106. By controlling the rate of draining through valve 106 a uniformly mixed bed can be obtained which is not only level but free of excess air. At one point near the end of the transfer, drain valve 106 is closed for a short time to retain some water to aid in the building of a level bed. After the resin transfer into service unit A, the resin bed is rinsed and made ready for service.

As the service unit is being prepared for another run, the exhausted resins from the storage tank are transferred to the resin regenerating tank B. If tank B has to be drained first, drain valve 113 and vent valve 114 are opened. The transfer from tank C to tank B is made by opening vent valve 114, transfer line valves 104 and 111 and water valves 115 and 116. The hydraulic force of the incoming water thus move the resins from tank C through valve 104, along transfer line 10, through valve 111 and into tank B.

After the resins are transferred to tank B they are regenerated. Regeneration of the resins is by a standard mixed bed technique well known to those skilled in the art. Such techniques are disclosed, for example, in United States patents Stromquist et al. No. 2,771,424 and Reents et al. No. 2,605,084. After regeneration, the resins are mixed, rinsed, and put on standby until ready for transfer into the service unit.

The reason only hydraulic transfer means are relied upon in moving the resins from the tank A to the tank C and from tank C to tank B is that separation of the resins in the tank is not an important consideration. Where the transfer requires that the resins be maintained in a mixed state, as from tank B to tank A, the hydro-pneumatic means is used. The hydro-pneumatic means is superior in this step not only because the resins are kept mixed during transfer, but primarily because the minimum quantities of water that are used permit easy and rapid drain control necessary to insure the depositing of a uniform, level mixed bed in the service tank.

The storage tank could be eliminated if desired. Thus, instead of transferring the exhausted resin to the storage unit and then to the regenerating unit, the resin could be transferred directly from the service unit to the regenerating unit. However, down-time of the demineralizing system would be as great as for in-place regeneration since a fresh quantity of resin would not be immediately available, unless of course a separate and additional regenerating unit were incorporated in the system. Nevertheless, a two unit system (service and regenerating) would still provide the other advantages of external regeneration.

To further illustrate the invention a specific example of the method in actual operation will be described. In a power plant condensate demineralizing installation comprising a service unit, storage unit, regenerating unit, interconnecting pipe lines, suitable valves and sources of water, air under pressure and regenerants, the condensate water is passed through a treating zone or service tank to remove the last traces of impurities. Within the service tank is a mixed bed of ion exchange resins. The size of the bed is approximately 150 cubic feet. The condensate water is passed through this bed and thereby demineralized. After a period of time, the length of which varies with the quality of condensate water which is being demineralized, the resin bed becomes exhausted. The resins are then hydraulically transferred to the storage unit by introducing condensate water into the top of the service unit at the rate of 145.5 g.p.m. and into the bottom of the unit at 48.5 g.p.m. for a period of one minute while the appropriate valves are open. The service unit is then allowed to drain for approximately five minutes.

The process of transferring mixed regenerated resins from the regenerating tank to the service tank is then initiated. For one-half minute condensate water is introduced into the lower part of the regenerating tank at the rate of 26.4 g.p.m. This is for the purpose of raising the bed. During a second one-half minute, as the water continues to flow in, air is introduced into the lower part of the tank at the rate of 83 c.f.m. The water inflow is then stopped and for approximately two minutes thereafter the air only continues to be introduced into the bottom of the tank until the pressure in the tank reaches 40 p.s.i.g. A valve at the bottom of the regenerating tank is then opened and the resins are forced out of the tank through an interconnecting line and into the top of the service tank. At the same time air is also introduced into the top of the tank at 83 c.f.m. The actual transfer from the regenerating tank to the service tank takes place over a period of five minutes during which time condensate water is introduced into the lower part of the regenerating tank at 26.4 g.p.m. and air continues to be introduced at both the bottom and the top of the tank at 83 c.f.m. The resin is thereby transferred to the service tank in which the rinse outlet valve is open to allow the escape of the excess water and the vent valve is opened to permit the escape of excess air. Then, for approximately one minute, as the same quantities of air and water are being introduced, the drain valve in the service unit is closed to retain some water which under these conditions helps in the level displacement of the resin bed within the service tank and permits release of any free air from the underdrain and resin bed. The regenerating tank is then drained for approximately two minutes.

During approximately the next half hour, the service tank is flushed and rinsed and prepared for the service run. Over this same period, the resins in the storage unit are hydraulically transferred from the storage unit to the regenerating unit. To do this condensate water is introduced into the top of the storage tank at 82.8 g.p.m. and into the bottom of that tank at 27.6 g.p.m. This step continues for 13.3 minutes. Then it takes about five minutes to drain the storage tank.

The mixed resins are thereafter regenerated in the regenerating tank by a known method not described in detail. However, the technique generally involves backwashing the resin bed and allowing the particles to settle. Because of the different densities of the cation and anion resins the resins settle into two layers; anion resin at the top, cation resin at the bottom. A well defined median line separates the resin layers and it is at this line that an interfacial collecting outlet is located. The regeneration is effected by introducing caustic into the top of the tank and acid into the bottom. Both regenerants are withdrawn at the interfacial outlet. After regeneration the resins are rinsed and then mixed by introducing water into the tank and air under pressure into the bottom of the tank.

The resins are then kept in standby until the resins in the service tank become exhausted. The cycle is then repeated.

The sequence above described specifically illustrates the method as presently used. Of course it is understood that the method need not be confined to that sequence. For example, it is possible to make the initial transfer from the service tank to the regenerating tank. After regeneration the resin could then be transferred to a storage unit.

I claim:

1. The method of transferring mixed solids of differing densities from one zone to a second zone, wherein the mixed solids are substantially uniformly distributed throughout a solids bed in said second zone, which comprises fluidizing the mixed solids in said first zone by introducing liquid and gas into the mixed solids in said first zone, pressuring said fluidized mass by means of gas under sufficient pressure to cause a transfer of the fluidized mass to the second zone and removing the liquid and gas from the fluidized mass in said second zone with sufficient rapidity to maintain the uniform distribution of the mixed solids.

2. The method of transferring mixed solids of differing densities from a closed unit to a second unit via interconnecting transfer lines comprising fluidizing the mixed solids in said closed unit by introducing liquid and gas into the mixed solids mass in the closed unit, pressurizing the fluidized mixed solids mass by means of gas introduced into said closed unit under sufficient pressure to cause a transfer of the fluidized mixed solids mass from said closed unit through said transfer lines into said second unit, and removing the liquid and gas from the fluidized mixed solids mass so deposited in said second unit with sufficient rapidity to maintain the uniform distribution of the solids in a mixed bed.

3. The method of hydro-pneumatically transferring mixed solids of differing densities from one tank to a second tank via interconnecting transfer lines comprising fluidizing the mixed solids in the lower part of the first tank by introducing liquid and gas into the lower part of said first tank, pressurizing the mixed solids mass by introducing gas into the upper part of said first tank not occupied by the fluidized mixed solids mass under sufficient pressure to transfer the fluidized mass through the interconnecting transfer lines to the second tank, transferring the fluidized mass from the lower part of the first tank, through the interconnecting transfer lines, to the upper part of the second tank, depositing the fluidized mass into the second tank, and removing the gas from the fluidized mass by allowing it to escape from a suitable vent in the second tank and draining the liquid from the fluidized mass at a rate sufficient to maintain the uniformly mixed state of the solids.

4. In an external resin regenerating installation comprising a service tank, a resin regenerating tank, interconnecting pipelines, suitable valves, vents, and drains, sources of water, sources of gas under pressure, and sources of regenerants the method for transferring mixed regenerated ion exchange resins of differing densities from the resin regenerating tank into the service tank comprising fluidizing the mixed resins in the lower part of the regenerating tank by introducing air and water into the regenerated resin bed, pressurizing the fluidized resin bed by introducing air into the upper part of the resin regenerating tank under sufficient pressure to cause the transfer of the fluidized resin mass from the regenerating tank to the service tank, transferring the fluidized resin mass from the lower part of the resin regenerating tank, through the interconnecting pipeline into the upper part of the service tank, the turbulent action of the air under pressure in the water maintaining the resin in a mixed state as it proceeds from the resin regenerating tank into the service tank, and removing the air and water from the fluidized resin mass by means of suitable vents and drains at rates sufficient to maintain the mixed uniformity of the resins deposited in the service tank and to permit the release of entrapped air from the resin bed and underdrain.

5. In a water demineralization installation incorporating an external resin regeneration system the method of transferring mixed ion exchange resins of differing densities from a regeneration unit to a service unit via interconnecting transfer lines comprising fluidizing the regenerated resin mass by introducing water and gas into the resin mass, pressurizing the fluidized mass by introducing gas into that part of the regenerating unit not occupied by the fluidized resin mass under sufficient pressure to force the fluidized resin mass from the regeneration tank through the interconnecting transfer lines into the service tank, the action of the gas and water under pressure permitting the transfer of the resins through the interconnecting transfer lines with a minimum volume of water and with minimum friction.

References Cited in the file of this patent

UNITED STATES PATENTS

| | | |
|---|---|---|
| 2,572,082 | Welsh | Oct. 23, 1951 |
| 2,736,698 | Klumb et al. | Feb. 28, 1956 |